March 3, 1964 S. A. COGSDILL 3,122,947
DEBURRING TOOL
Filed Dec. 26, 1961
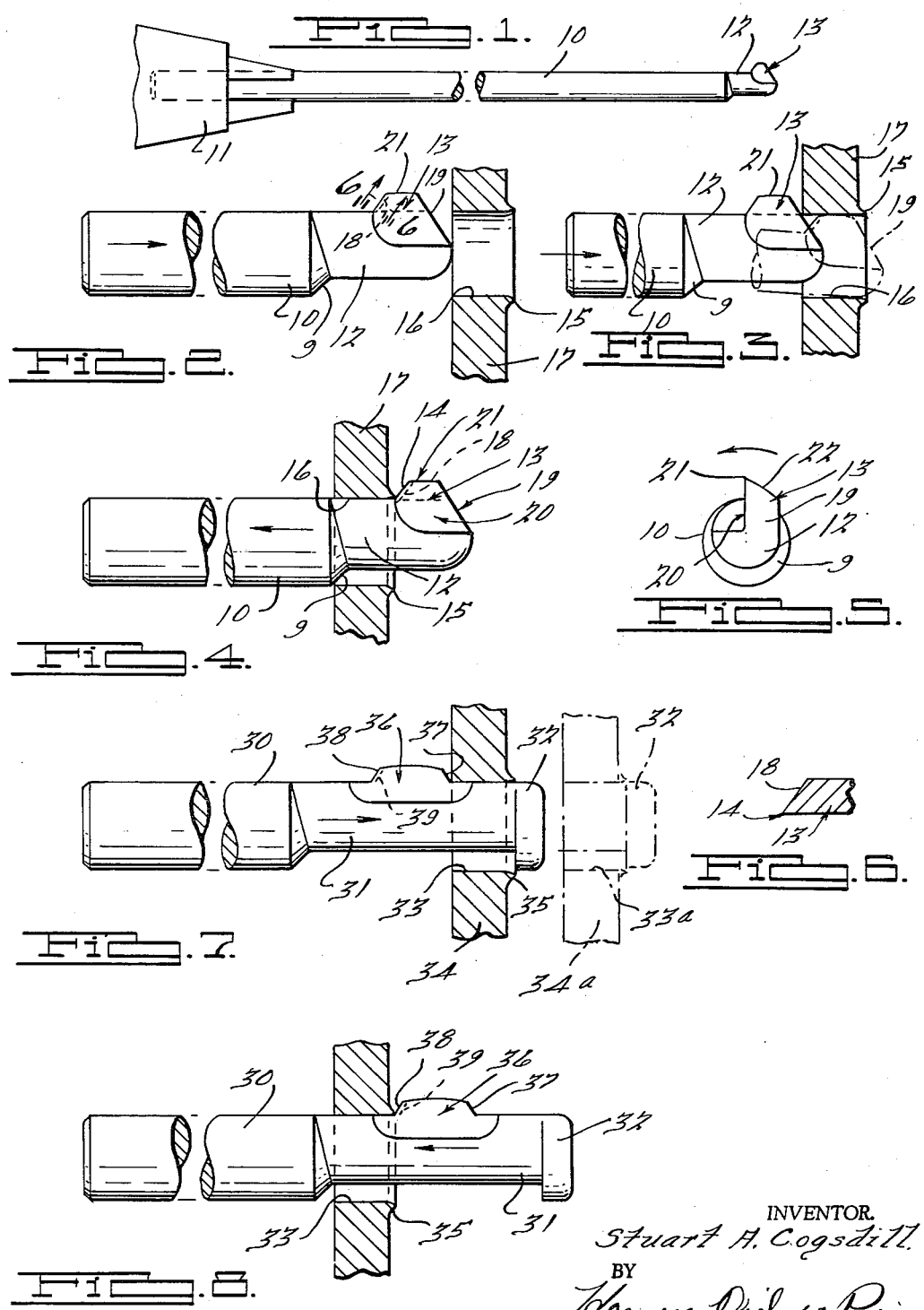
INVENTOR.
Stuart A. Cogsdill
BY
Harness, Dickey & Pierce
ATTORNEYS United States Patent Office 3,122,947
Patented Mar. 3, 1964

3,122,947
DEBURRING TOOL
Stuart A. Cogsdill, Orchard Lake, Mich., assignor to Cogsdill Tool Products, Inc., Oak Park, Mich., a corporation of Michigan
Filed Dec. 26, 1961, Ser. No. 161,898
9 Claims. (Cl. 77—73.5)

This invention relates to deburring tools, and particularly to a deburring tool capable of cutting the protruding burrs from the edges of holes of small diameter.

A burr is usually formed on one or both faces of a workpiece when a hole is drilled, punched, or otherwise formed therein or therethrough. Deburring tools have heretofore been provided for cutting the protruding burr from the edge of the hole. However, in such prior art deburring tools, the type of blade employed and the mechanism for controlling the actuation of the blade necessitated a tool of such a large diameter or over all dimensions as to render it incapable for use with small diameter holes.

Accordingly, one of the principal objects of this invention is to provide a deburring tool suitable for use in connection with holes too small to be deburred by the tools of the prior art.

Another object of the invention is to provide a deburring tool in which the body, shank or spindle of the tool has sufficient inherent flexibility to permit deflection of the deburring nib as it enters the hole and to hold the cutting edge of the nib in engagement with the workpiece throughout the deburring operation.

Another object of the invention is to provide a tool of this type having a cam or camming surface adapted, upon engagement with the hole in the workpiece, to flex or bend the body or spindle of the tool to deflect the deburring nib to cause the cutting edge thereof to engage the burr to be removed.

Still another object of the invention is to provide a tool of this type in which the body or spindle of the tool and the deburring nib are integrated or formed in one piece whereby the reactive force of the body or shank of the tool, when flexed, is imposed directly upon or transmitted directly to the deburring nib without the necessity of any intervening blade controlling mechanism. Thus the diameter or over-all dimensions of the tool can be drastically reduced whereby tools made in accordance with this invention may be produced in sizes suitable for deburring very small holes.

A furhter object of the invention is to provide a deburring tool of this type having a nib with cutting edges on two portions thereof for cutting a burr on both sides of a workpiece or which may have a single cutting edge for cutting only the top or bottom burr on the workpiece.

A still further object of the invention is to provide a tool of this type having a pilot member or portion at the front end of the tool adapted to enter the hole in the workpiece to initially align the tool with the hole prior to engagement of the deburring nib therewith.

Various other objects and advantages and the novel details of construction of several forms of the device will become more apparent as this description proceeds, especially when considered in connection with the accompanying drawings in which:

FIG. 1 is a broken elevational view of a chuck and a deburring tool embodying features of the present invention, FIG. 2 is a broken elevational view of the tool shown approaching a hole in a workpiece which is to be deburred, FIG. 3 is a view similar to FIG. 2 showing the camming surface of the tool engaging the hole in the workpiece to flex or bend the shank of the tool to deflect the deburring nib, FIG. 4 is a view similar to FIG. 2 showing the tool just prior to the deburring operation, FIG. 5 is an end elevation of the deburring end of the tool, FIG. 6 is a detail sectional view taken on line 6—6 of FIG. 2, FIG. 7 is a view similar to FIG. 3 showing a modified form of the invention, and FIG. 8 is a view of the tool shown in FIG. 7 just prior to the deburring operation.

Referring to the accompanying drawing, wherein similar reference characters designate similar parts throughout, the improved tool comprises a body, shank, or spindle 10 having one end thereof shaped so that it may be chucked in the chuck 11 of a drill press, drill motor, or the like, to rotate the spindle of the tool about its central axis.

The body or spindle 10 has a reduced end portion 12 which carries a nib 13. The nib 13 projects laterally from the end portion 12 beyond the plane of the body 10 at one side thereof. The reduced end portion 12 is offset from the axis of the spindle 10 an amount equal to the distance the nib projects laterally, whereby the combined dimensions of the end portion 12 and nib 13 equal the diameter of the spindle 10.

This reduced end portion 12 permits movement of the end of the tool in the opening in the workpiece. The nib-carrying portion 12 and the nib are preferably formed from one piece of material which may be integrated with the body or spindle 10 or may be formed in one piece therewith. In any event, the resulting structure is an integral, one-piece construction comprising the body or spindle 10, the nib-carrying end portion 12 and the nib 13.

The body or spindle 10 is formed of spring steel or any other preferred type of steel or other suitable material capable of limited flexing or bending under a lateral force or pressure and having the property of resuming its original shape after such flexing or deformation.

As shown in FIGS. 2, 3, 4 and 5, the nib 13 is formed with a cutting edge 14 adapted to remove the burr 15 from the hole 16 of a workpiece 17. The cutting edge 14 is relieved as at 18, as illustrated in FIG. 6 in a direction opposite to the direction of rotation of the spindle 10 of the tool.

The nib 13 is provided with a forwardly presented cam or camming surface 19 adapted to engage the hole 16 in the workpiece and, as the tool is advanced, to exert a lateral force or pressure to flex or bend the body or spindle 10 of the tool to deflect the burring nib 13 to cause the nib to enter the hole 16. The reaction of the flexible spindle or body 10 holds the cutting edge 14 in engagement with the workpiece throughout the deburring operation.

The nib 13 is cut away as at 20 to provide chip clearance for the cuttings removed by the nib and a proper rake angle to the cutting edge. The outer face 21 of the nib is relieved as at 22 in a direction opposite the direction of rotation of the nib in the workpiece.

The operation of the tool will be apparent from a consideration of FIGS. 2, 3 and 4. As shown in FIG. 2, the tool is advanced in the direction of the arrow toward the hole 16 in the workpiece 17, whereupon the cam surface 19 engages the edge of the hole as shown in FIG. 3. Continued movement of the tool causes the cam surface 19 to flex or bend the body or spindle 10 of the tool to deflect the deburring nib a distance equal to the amount the nib projects laterally beyond the body of the tool so that the nib enters the opening 16 and may pass therethrough to occupy a position with respect to the workpiece such as is shown in FIG. 4. Upon the reverse movement of the tool, the cutting edge 14 cuts the burr 15 from the workpiece.

The cutting edge 14 is inclined with respect to the axis of the spindle 10 to act as a cam surface, so that during the deburring operation the body or spindle 10 is again flexed or bent to permit the nib 13 to clear the hole 16 during the return movement of the tool.

In FIGS. 7 and 8, a slightly modified form of construction is illustrated in which the inherently resilient body of the tool is indicated by the reference character 30. The nib-carrying end 31 of the tool terminates in a pilot member 32 adapted to initially enter the hole 33 in a workpiece 34 having a burr 35 on the edge of the hole 33. This pilot member 32 finds particular utility when the deburring tool is used for removing the burrs from holes formed in a double wall or two-veneer structure. In FIG. 7 the second wall of the workpiece is indicated in dotted lines by the reference character 34a, and a second hole is indicated by the reference character 33a.

In this form of construction, the nib 36 is provided with two inclined surfaces 37 and 38, one of which, for instance surface 37, may constitute a camming surface and the surface 38 a cutting edge. However, the camming surface 37 may also be provided with a cutting edge, if desired.

In this form of construction, when the tool is advanced in the direction of the arrow, as shown in FIG. 7, the camming surface 37 will flex or bend the body or spindle of the tool to deflect the nib 36 to cause the same to enter the hole 33 in the workpiece so that the nib end of the tool may pass through the opening. Upon the return movement of the tool as indicated by the arrow in FIG. 8, the cutting edge 38 engages the burr 35 to remove the same. The inherent resiliency of the body holds the cutting edge against the burr and the cam surface 9 backs up the cutting edge if it deflects toward the center of the aperture. During the cutting operation, the cutting edge 38, which is inclined, causes the body of the tool 30 to flex or bend sufficiently to permit the return movement of the nib 36 through the opening 33 in the workpiece. The cutting edge 38 may be relieved, as at 39, in the same manner as the cutting edge 14 shown in FIG. 6. The pilot serves to align the tool with either or both openings 33 and 33a but is spaced from the nib 36 so as to pass out of the openings before the spindle 30 is flexed by the cam surface 37.

It will be understood that in both forms of the invention the body or spindle 10 is bent or flexed throughout its length from the point where it emerges from the chuck 11 to its free end. Thus the bending moment at any one point along the spindle 10 is very small.

In view of the fact that the deburring tool of this invention consists essentially of a one-piece integral construction, it may be produced in sizes suitable for deburring very small holes. The elimination of the blade or nib-controlling mechanism results in a tool which is simple in construction and may be economically manufactured.

While two forms of the invention have been described and illustrated in detail, it will be understood that various changes may be made as may come within the purview of the accompanying claims.

What is claimed is:

1. A deburring tool comprising, a spindle and a deburring nib on one end thereof, said spindle being formed of material capable of flexing under lateral pressure, and cam means associated with the nib for engagement with a hole in a workpiece to flex said spindle to deflect the deburring nib laterally within the hole into operative engagement with the edge of the hole.

2. A deburring tool comprising, a spindle formed of inherently flexible material, a deburring nib on one end of said spindle, and cam means associated with said nib for initial engagement with a hole in a workpiece to flex said spindle to move the deburring nib laterally within the hole into operative engagement with the edge of the hole.

3. A tool for removing a burr from the edge of a hole in a workpiece comprising, a shank, a spindle on said shank formed of a material capable of limited flexing under lateral pressure, the axis of the spindle and shaft being offset from each other a laterally extending deburring nib at the end of said spindle, and a cam surface on the end of said spindle in advance of said deburring nib adapted to initially engage the hole in the workpiece to exert a lateral flexing force on said spindle to move said deburring nib laterally within the hole and thereafter into operative engagement with the edge of the hole.

4. A deburring tool comprising, a spindle formed of spring steel or the like capable of limited flexing under lateral pressure, a laterally extending deburring nib at one end of said spindle, a cutting edge on said nib, and a cam surface on said nib in advance of said cutting edge for initial engagement with a hole in a workpiece to exert a lateral flexing force on said spindle to move the cutting edge of said nib laterally within the hole and thereafter into operative engagement with the edge of the hole.

5. A deburring tool comprising, a spindle formed of spring steel or the like capable of limited flexing when lateral pressure is applied at its free end, a deburring nib at the free end of said spindle, a laterally extending cutting edge on said nib, and a cam surface on said nib in advance of said cutting edge adapted for engagement with a hole in a workpiece as the tool is advanced to exert a lateral flexing force on said spindle to move the cutting edge of said nib laterally within the hole and thereafter into operative engagement with the edge thereof.

6. A tool as described in claim 5 in which the cutting edge is inclined with respect to the axis of the spindle to act as a cam surface to flex the spindle during the deburring operation to permit the nib to clear the hole during the return movement of the tool.

7. A tool as described in claim 5 in which the deburring nib is carried by a reduced end portion of the spindle offset from the axis of the spindle an amount equal to the height of the laterally extending cutting edge.

8. A tool as described in claim 5 in which the spindle and deburring nib are integrated into a one-piece construction and the diameter of the tool is such as to permit the deburring of very small holes.

9. A tool as described in claim 5 in which the spindle is provided with an extension in advance of said deburring nib to provide a pilot member adapted to initially enter the hole or holes in the workpiece to align the tool therewith.

References Cited in the file of this patent

UNITED STATES PATENTS 2,895,356    Cogsdill _____ July 21, 1959

FOREIGN PATENTS 315,601    Germany _____ Oct. 28, 1919